(12) United States Patent
Liang et al.

(10) Patent No.: US 7,605,990 B2
(45) Date of Patent: Oct. 20, 2009

(54) LENS SYSTEM

(75) Inventors: Kuo-Yen Liang, Taipei Hsien (TW);
Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/116,052

(22) Filed: May 6, 2008

(65) Prior Publication Data

US 2009/0237808 A1 Sep. 24, 2009

(30) Foreign Application Priority Data

Mar. 20, 2008 (CN) .......................... 2008 1 0300639

(51) Int. Cl.
*G02B 13/18* (2006.01)
*G02B 3/02* (2006.01)
*G02B 9/06* (2006.01)

(52) U.S. Cl. ........................................ 359/794; 359/717

(58) Field of Classification Search .................. 359/717, 359/691, 793, 794
See application file for complete search history.

(56) References Cited

U.S. PATENT DOCUMENTS

2008/0074760 A1  3/2008  Sato

*Primary Examiner*—Alicia M Harrington
(74) *Attorney, Agent, or Firm*—Andrew C. Cheng

(57) ABSTRACT

A lens system includes a first lens and a second lens formed in turn from an object side to an image side. The lens system satisfies the following conditions:

$$0.08 \leq D2/D \leq 0.14 \qquad (1)$$

$$4 \leq h2/z2 \leq 12 \qquad (2)$$

wherein,

D2 is the distance along an optical axis of the lens system from the second surface of the first lens to the third surface of the second lens, D is the distance along an optical axis of the lens system from the first surface of the first lens to fourth surface of the second lens, h2 is the distance from the optical axis of the lens system to the outermost optically effective portion of the second lens surface of the first lens, and z2 is the distance along the optical axis of the lens system from the vertex of the second surface of the first lens to the point of the optical axis where h2 is measured.

18 Claims, 7 Drawing Sheets

LENS SYSTEM

BACKGROUND

1. Technical Field

The present invention relates to lens systems and, particularly, to a compact lens system having a small number of lens components and a short overall length.

2. Description of Related Art

Conventionally, there is a technical field of lenses where a short overall length is demanded for use in lens module for image acquisition. The lens module is mounted in relatively thin equipment, such as simple digital cameras, webcams for personal computers, and portable imaging systems in general. In order to satisfy this demand of compact lens system, conventional lens systems reduce the number of lenses to short the overall length, but resolution will be suffered. Conversely, increasing the number of lenses can increase resolution, but increasing overall length of the lens systems.

In a lens system, good image quality and compact size is required for portability. Therefore, it has become necessary to develop a lens system with a short overall length and an optical performance that matches image sensing chips having enhanced resolution.

Therefore, what is desired is a lens system with a short overall length and relatively good optical performance.

SUMMARY

In accordance with an embodiment, a lens system includes a first lens and a second lens arranged in turn from an object side to an image side. The first lens includes a first surface facing toward the object side and a second surface facing toward the image side. The second lens includes a third surface facing toward the object side and a fourth surface facing toward the image side. The first, second, third and the fourth surface all are aspherical; the lens system satisfies the following conditions:

$$0.08 \leq D2/D \leq 0.14 \quad (1)$$

$$4 \leq h2/z2 \leq 12 \quad (2)$$

wherein,

D2 is the distance along an optical axis of the lens system 100 from the second surface of the first lens to the third surface of the second lens, D is the distance along the optical axis of the lens system 100 from the first surface of the first lens to fourth surface of the second lens, h2 is the distance from the optical axis of the lens system 100 to the outermost optically effective portion of the second surface of the first lens, and z2 is the distance along the optical axis of the lens system 100 from the vertex of the second surface of the first lens to the point of the optical axis where h2 is measured.

Other advantages and novel features will be drawn from the following detailed description of at least one present embodiment, when considered in conjunction with the attached drawings.

BRIEF DESCRIPTION OF THE DRAWINGS

Many aspects of the present lens system can be better understood with reference to the accompanying drawings. The components in the drawings are not necessarily drawn to scale, the emphasis instead being placed upon clearly illustrating the principles of the present lens system. Moreover, in the drawings, like reference numerals designate corresponding parts throughout the several views.

DETAILED DESCRIPTION OF THE EMBODIMENTS

Embodiments of the present lens system will be now described in detail with reference to the drawings.

Figure 1:
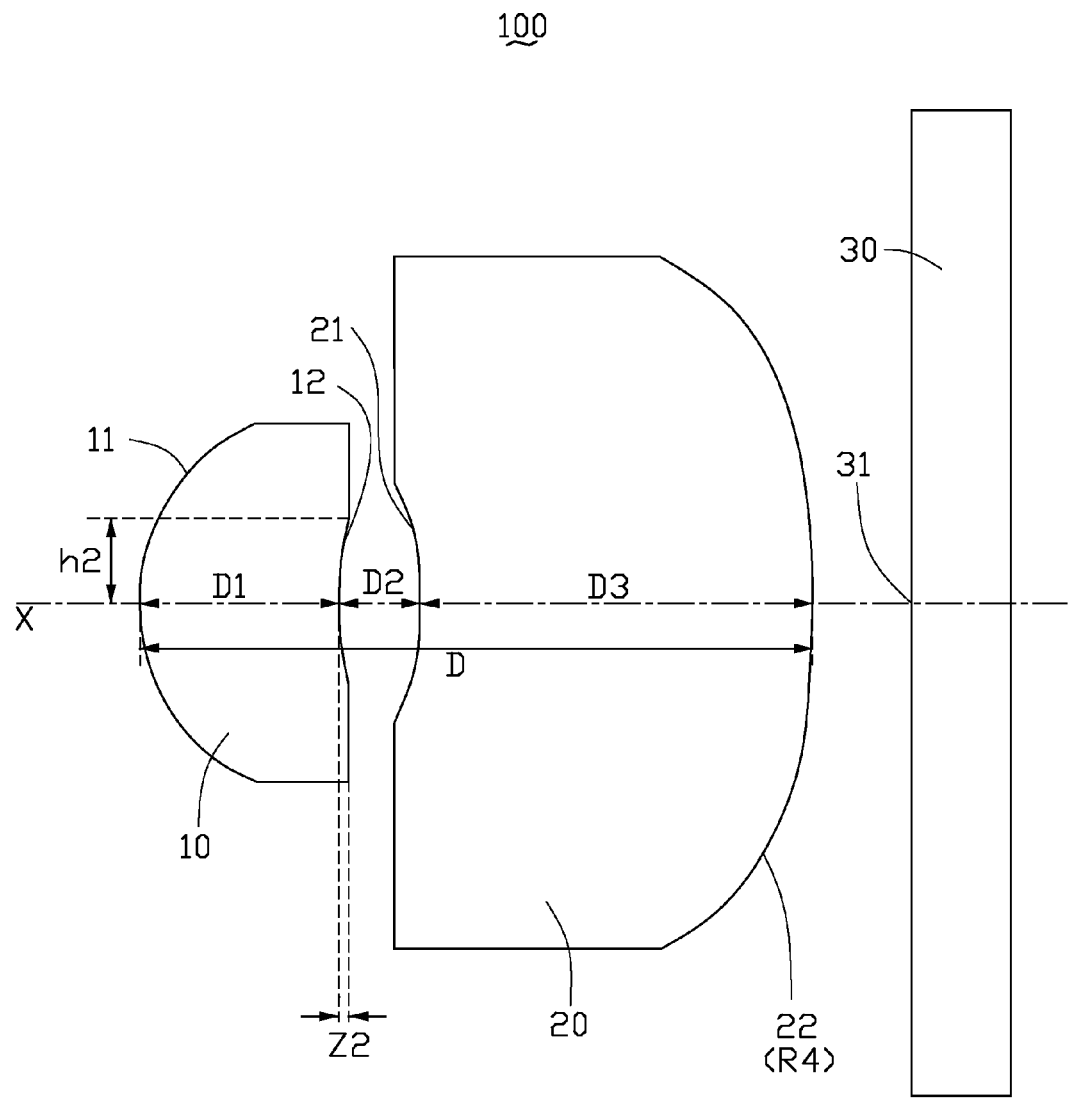
FIG. 1 is a schematic view of a lens system in accordance with an embodiment of the present invention.

Referring to FIG. 1, a lens system 100, according to an embodiment of the present invention, is shown. The lens system 100 includes a first lens 10, a second lens 20, and an image sensor 30 arranged in turn from an object side to an image side. When taking an image, light beams travel through the first lens 10, then through the second lens 20 and finally strike a photosensitive area 31 of the image sensor 30. The image sensor 30 can be, for example, a charged coupled device (CCD), or a complementary metal-oxide-semiconductor (CMOS) transistor.

The first lens 10 includes a first surface 11 is convex facing toward the object side, and a second surface 12 is concave facing towards the image side, thereby defining a meniscus shape. The first and second surfaces 11, 12 are aspherical.

The second lens 20 includes a third surface 21 is concave facing towards the object side, and a fourth surface 22 is convex facing towards the image side, thereby defining a meniscus shape. The third and fourth surface 21, 22 are aspherical.

In order that the lens system 100 has a short overall length and excellent optical performance, the lens system 100 satisfies the following conditions:

$$0.08 \leq D2/D \leq 0.14 \quad (1)$$

$$4 \leq h2/z2 \leq 12 \quad (2)$$

wherein, D2 is the distance along an optical axis of the lens system 100 from the second surface 12 of the first lens 10 to the third surface 21 of the second lens 20, D is the distance along the optical axis of the lens system 100 from the first surface 111 of the first lens 10 to the fourth surface 22 of the second lens 20, h2 is the distance from the optical axis of the lens system 100 to the outermost optically effective portion of the second surface 12 of the first lens 10, and z2 is the distance along the optical axis of the lens system 100 from the vertex of the second surface 12 of the first lens 10 to the point of the optical axis from where h2 is measured.

The first condition (1) is for miniaturizing the lens system 100. If the ratio D2/D of condition (1) is smaller than 0.08, the first lens 10 and the second lens 20 are too close to each other. On the other hand, if the ratio D2/D of condition (1) is larger than 0.14, the distance D of the lens system 100 tends to be too long, in turn tending to make the distance from the first surface 11 of the first lens 10 to the photosensitive area 31 of the image sensor 30 too long, which also tends to increase the overall length of the lens system 100.

The second condition (2) is for improving the imaging performance of the lens system 100. If the ratio h2/z2 of condition (2) is smaller than 4 or larger than 12, coma increases. If this aspect of the imaging performance is particularly emphasized, it is preferable for the ratio h2/z2 of condition (2) to be larger than 4 and smaller than 12.

Preferably, along with satisfying conditions (1) and (2) above, the lens system 100 further meets the following condition:

$$0.9 \leq |f/R4| \leq 4 \quad (3)$$

wherein, f is the focal length of the entire lens system 100, and R4 is the radius of curvature of the fourth surface 22 of the second lens 20.

The third condition (3) is for overcoming problems of imaging performance associated with manufacturing errors of the lens system 100. If the ratio |f/R4| of condition (3) is larger than 4, the radius of curvature R4 becomes too small, making the refractive power of the fourth surface 22 too large. The larger the refractive power of the fourth surface 22, the more any misalignment of the fourth surface 22 and the third surface 21 deteriorates the image produced by the lens system 100. Therefore, if the radius of the fourth surface 22 is too small, it becomes difficult to manufacture the second lens 20 with a high yield.

It is preferable that the lens system 100 satisfying conditions (1) and (2) or simultaneity satisfying condition (1), (2) and (3) above further meets the following conditions:

$$|f2/f| \geq 1 \quad (4)$$

$$1 \leq (f2)^2/|f1 \cdot f| \leq 35 \quad (5)$$

wherein, f is the focal length of the entire lens system 100, f2 is the focal length of the second lens 20, and f1 is the focal length of the first lens 10.

The miniaturization and enhancement of image quality can be realized by properly setting the ratios |f2/f| and $(f2)^2/|f1 \cdot f|$ of conditions (4) and (5). If the ratio |f2/f| of condition (4) is larger than or equal to 1 and the ratio $(f2)^2/|f1 \cdot f|$ of condition (5) is larger than 35, the distance from the first surface 11 of the first lens 10 to the photosensitive area 31 of the image sensor 30 becomes too long, making the entire lens system 100 too long. On the other hand, if the ratio |f2/f| of condition (4) is larger than or equal to 1 and the ratio $(f2)^2/|f1 \cdot f|$ of condition (5) is smaller than 1, it is hard to favorably correct coma.

Moreover, it is preferable that the lens system 100 satisfying conditions (1) and (2), simultaneity satisfying condition (1), (2) and (3) or simultaneity satisfying condition (1), (2), (3), (4) and (5) above further meets the following condition:

$$Vd1 \geq Vd2 \quad (6)$$

wherein, Vd1 is the Abbe number at the d-line ($\lambda$=587 nm) of the lens material of the first lens 10, and Vd2 is the Abbe number at the d-line ($\lambda$=587 nm) of the lens material of the second lens 20.

The third condition (6) is for overcoming problems of image performance associated with manufacturing errors of the lens system 100. When the condition Vd1>Vd2 is met, it effectively reduces chromatic aberrations and improves imaging performance. On the other hand, when chromatic aberrations are not a major problem, and the condition Vd1=Vd2 provides adequate imaging performance and allows the same material to be used for the first lens 10 and the second lens 20, manufacturing the lens system 100 is relatively easy.

Referring to FIGS. 2~7, examples of the lens system 100 are described in the following paragraphs. In each example, both surfaces of the first lens 10, and both surfaces of the second lens 20 are aspherical. The shape of each aspherical surface is determined by expression 1 below. Expression 1 is based on a Cartesian coordinate system, with the vertex of the surface being the origin, and the optical axis extending from the vertex being the x-axis.

Expression 1:

$$Z = \frac{ch^2}{1 + \sqrt{1 - (k+1)c^2h^2}} + \sum A_i h^i$$

wherein, Z is the length of a line drawn from a point on the aspherical lens surface at a distance h from the optical axis to the tangential plane of the aspherical surface vertex, h is a height from the optical axis to the surface, c is a vertex curvature (=1/R, the radius of curvature), k is a conic constant, and $A_i$ are i-th order correction coefficients of the aspherical surfaces.

EXAMPLE 1

The follow table 1 and table 2 show specifications of Example 1 of the lens system 100.

TABLE 1

| Surface | Type | Radius of curvature (mm) | Thickness (mm) | Refractive index | Abbe number | Conic constant |
|---|---|---|---|---|---|---|
| First surface 11 | Aspherical | 0.4145524 | 0.3806479 | 1.54 | 57 | 0.1893867 |
| Second surface 12 | Aspherical | 0.6970902 | 0.02 | | | −3.726891 |
| Third surface 21 | Aspherical | −1.034463 | 0.608531 | 1.53 | 56 | 1.387306 |
| Fourth surface 22 | Aspherical | −0.8721797 | 0.33 | | | 0 |

TABLE 2

| Aspherical coefficients | First surface 11 | Second surface 12 | Third surface 21 | Fourth surface 22 |
|---|---|---|---|---|
| A4 | −0.042094813 | 4.8935102 | −5.2832623 | 0.037529823 |
| A6 | −6.1256551 | −113.85723 | 91.881544 | −3.5780867 |
| A8 | 128.46245 | 5839.857 | −4077.6428 | 20.74005 |
| A10 | −1250.1452 | −82659.547 | 54990.237 | −66.536418 |
| A12 | 4499.8393 | −94031.715 | −239637.48 | 57.609519 |

Figure 2:
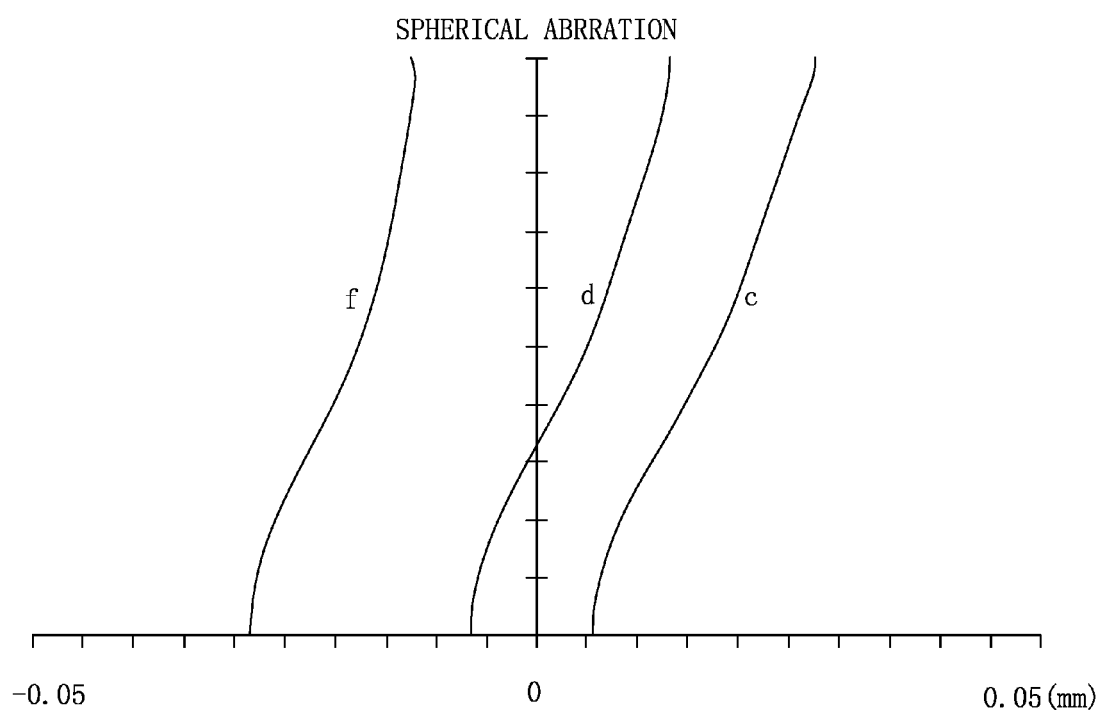
FIGS. 2-4 are graphs respectively showing spherical aberration, field curvature and distortion for a lens system in accordance with a first exemplary embodiment of the present invention.
Figure 3:
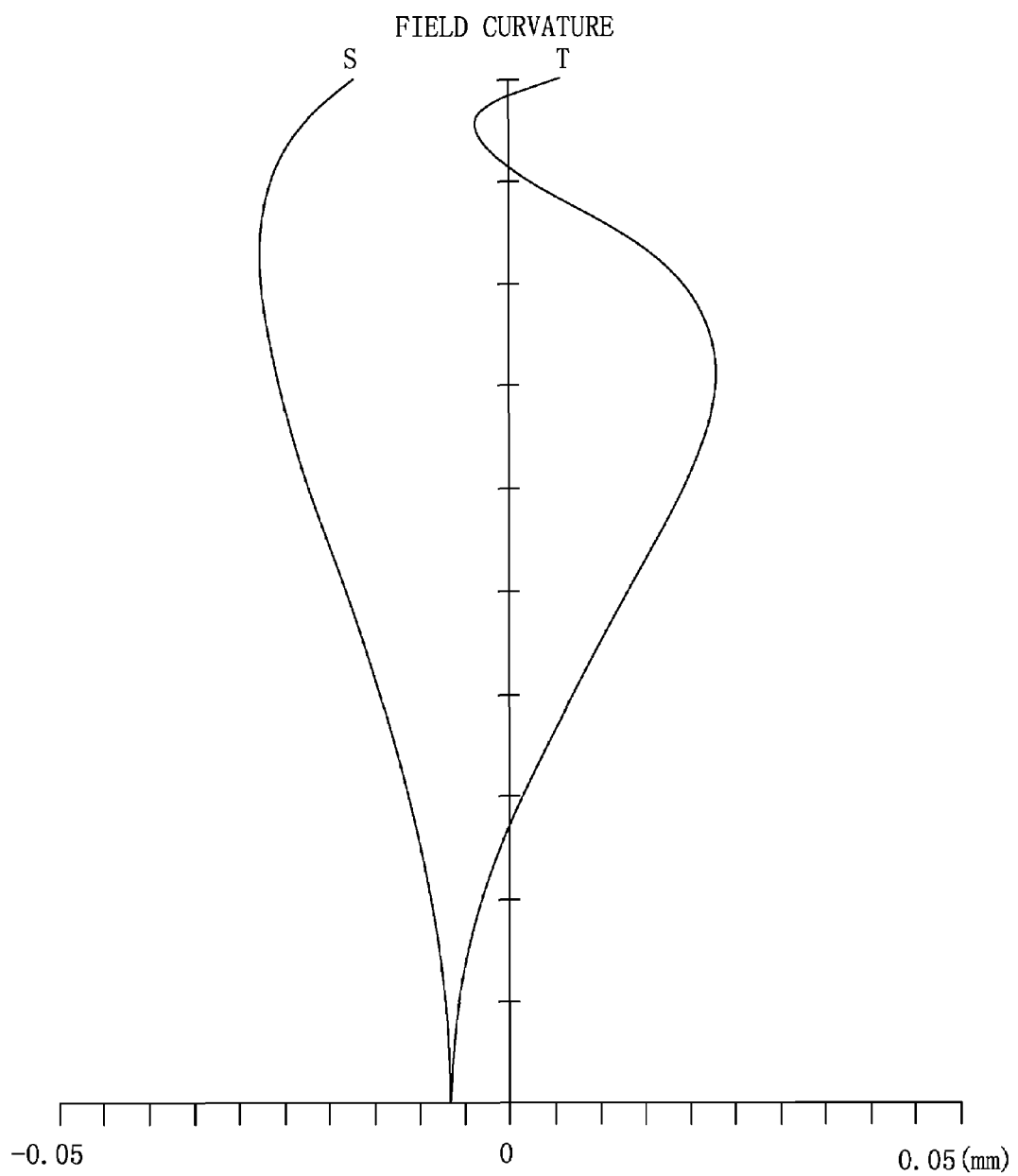
Figure 4:
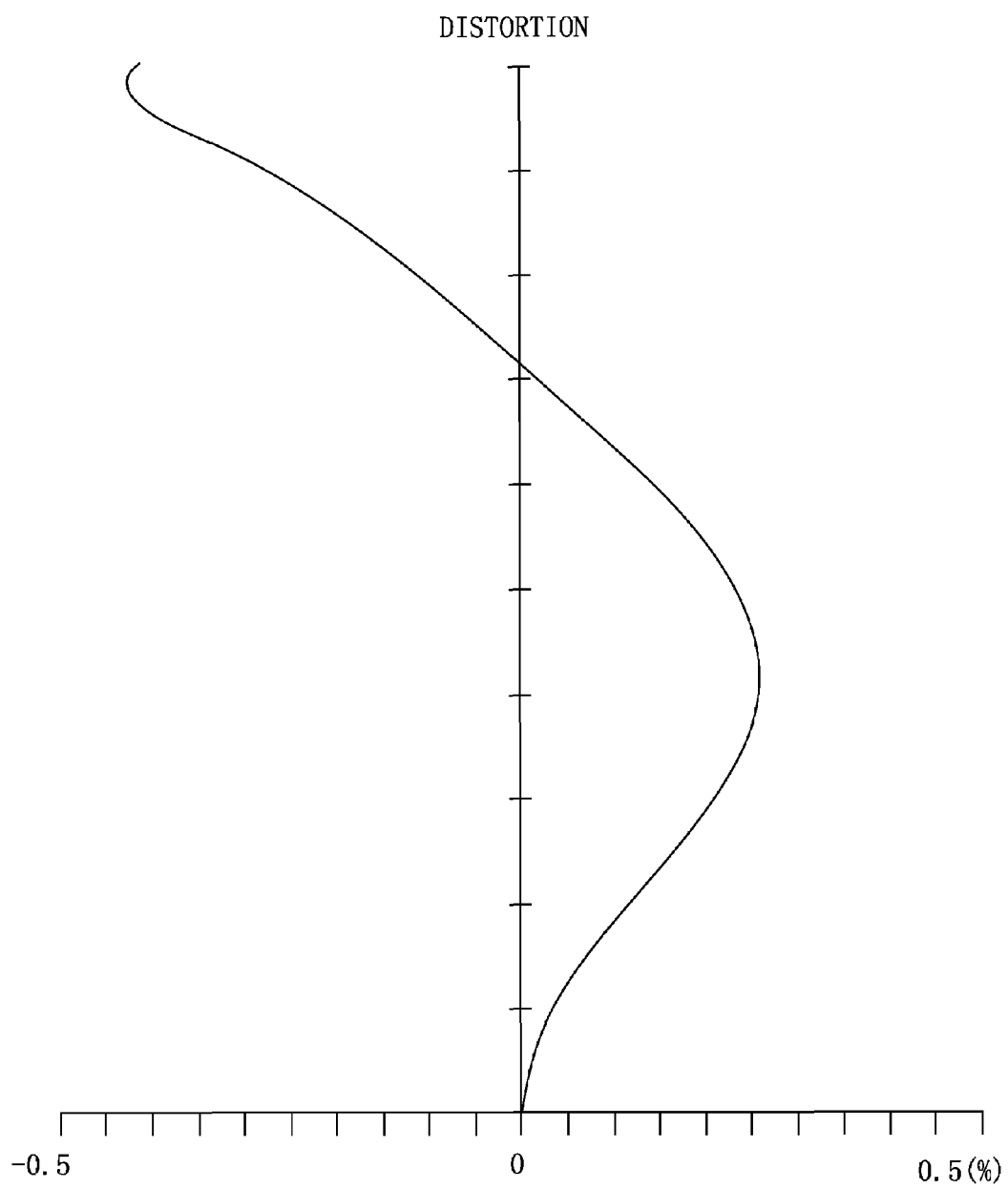

The spherical aberration diagram, the field curvature diagram, and the distortion diagram of the lens system 100 of Example 1 are respectively shown in FIGS. 2~4. Spherical aberrations of line f ($\lambda$=486 nm) and line d ($\lambda$=587 nm) and line c ($\lambda$=656 nm) are shown in FIG. 2. Generally, spherical aberration of visible light (with a wavelength between 400~700 nm) of the lens system 100 in the Example 1 is within a range of −0.05 mm to 0.05 mm. The sagittal field curvature and tangential field curvature shown in FIG. 3 are kept within a range of −0.05 mm to 0.05 mm. The distortion in FIG. 4 falls within a range of −0.5% to 0.5%. Obviously, the spherical aberration, field curvature, and distortion are well controlled in the Example 1 of the lens system 100.

The first lens 10 and the second lens 20 are aspherical plastic lenses. For example, the first lens 10 is made of polycarbonate, and the second lens 20 is made of two methacrylate resins.

EXAMPLE 2

The follow table 3 and table 4 show specifications of Example 2 of the lens system 100.

TABLE 3

| Surface | Type | Radius of curvature (mm) | Thickness (mm) | Refractive index | Abbe number | Conic constant |
|---|---|---|---|---|---|---|
| First surface 11 | Aspherical | 0.7970448 | 0.8035436 | 1.53 | 56 | 0.1031263 |
| Second surface 12 | Aspherical | 1.60569 | 0.05 | | | 4.795724 |
| Third surface 21 | Aspherical | −1.735905 | 1.58 | 1.585 | 30 | 0 |
| Fourth surface 22 | Aspherical | −4.580861 | 0.4 | | | 8.902471 |

TABLE 4

| Aspherical coefficients | First surface 11 | Second surface 12 | Third surface 21 | Fourth surface 22 |
|---|---|---|---|---|
| A4 | −0.016862187 | 0.14043024 | −0.51925091 | −0.031811554 |
| A6 | −0.049616401 | 1.1730983 | 0.74135122 | −0.079401959 |
| A8 | −0.0096566605 | −8.19901 | −9.5613108 | 0.074084977 |
| A10 | 0.20665549 | 59.756401 | 21.364254 | −0.036191291 |
| A12 | −0.51702176 | −45.913889 | −22.509886 | 0.0062738537 |

Figure 5:
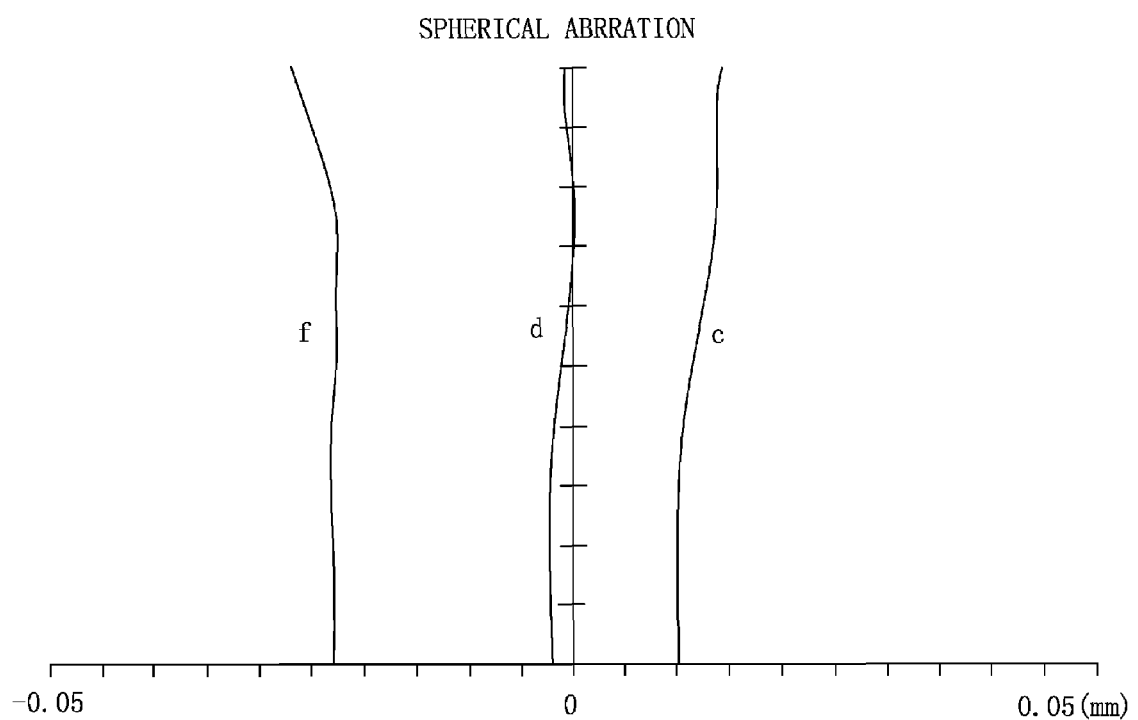
FIGS. 5-7 are graphs respectively showing spherical aberration, field curvature and distortion for a lens system in accordance with a second exemplary embodiment of the present invention.
Figure 6:
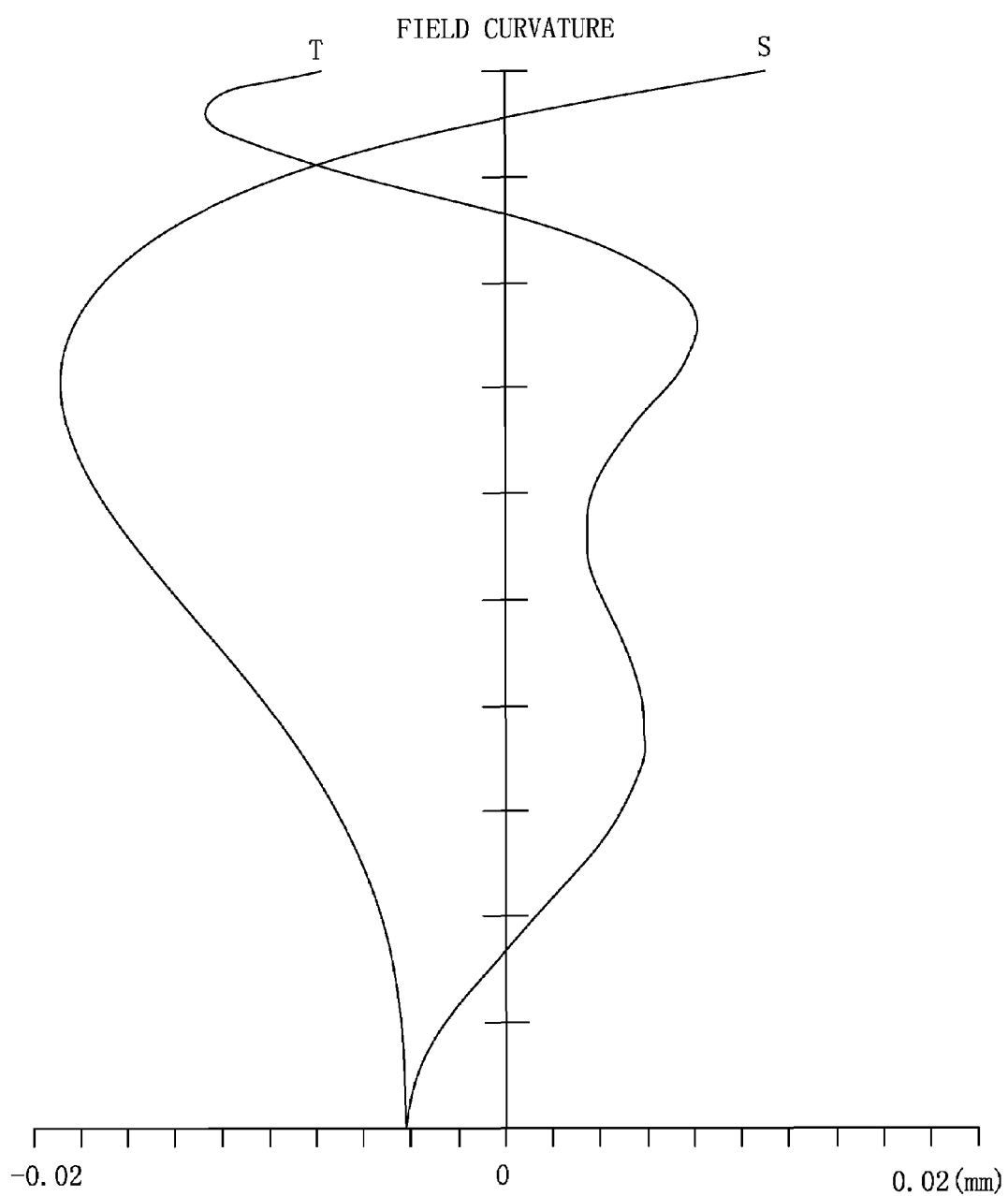
Figure 7:
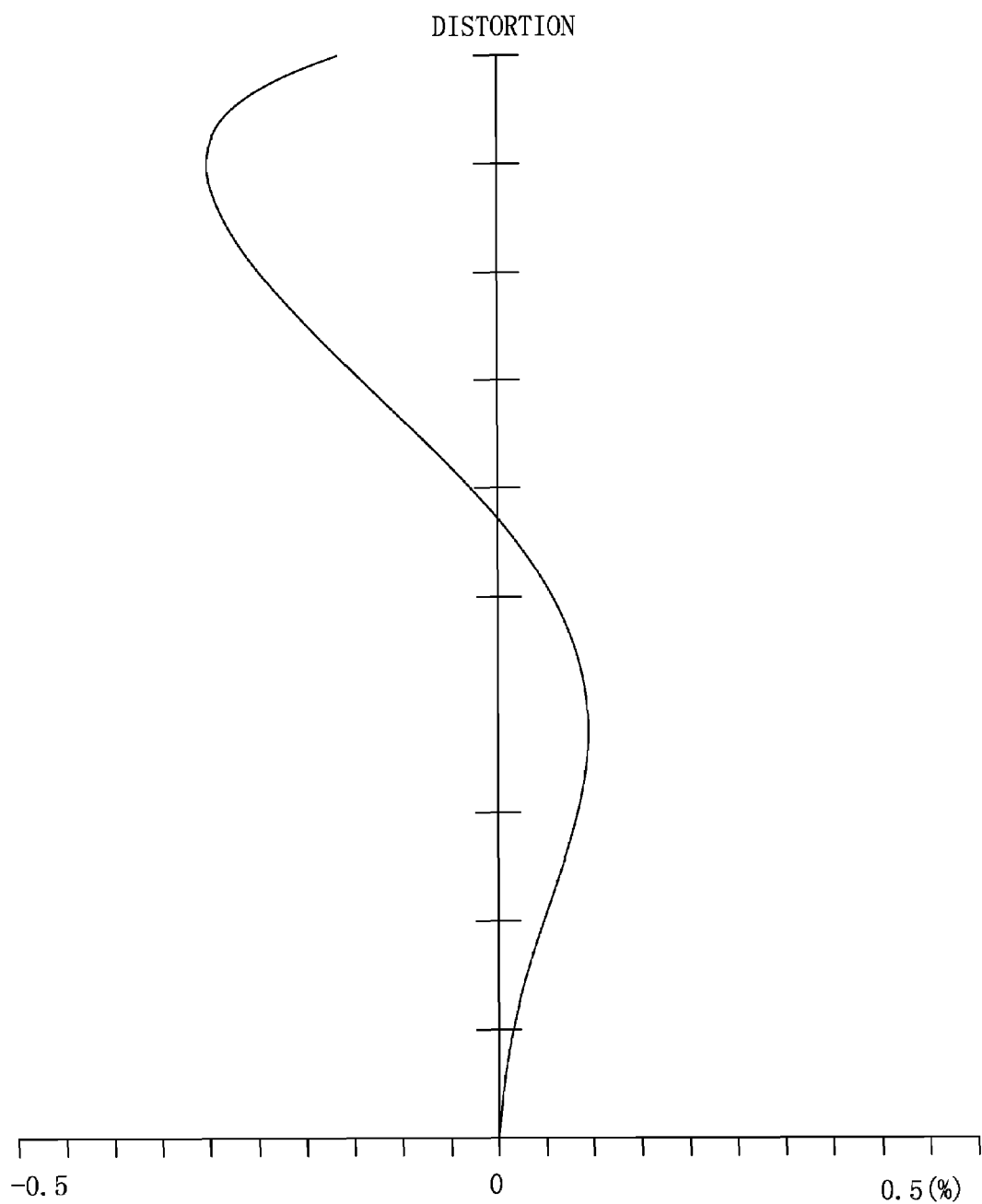

The spherical aberration diagram, the field curvature diagram, and the distortion diagram of the lens system 100 of Example 2 are respectively shown in FIGS. 5~7. Spherical aberrations of line f ($\lambda$=486 nm) and line d ($\lambda$=587 nm) and line c ($\lambda$=656 nm) are shown in FIG. 5. Generally, spherical aberration of visible light (with a wavelength between 400~700 nm) of the lens system 100 in the Example 2 is within a range of −0.05 mm to 0.05 mm. The sagittal field curvature and tangential field curvature shown in FIG. 6 are kept within a range of −0.05 mm to 0.05 mm. The distortion in FIG. 7 falls within a range of −0.5% to 0.5%. Obviously, the spherical aberration, field curvature, and distortion are well controlled in Example 2 of the lens system 100.

The first lens 10 and the second lens 20 are aspherical plastic lenses. For example, the first lens 10 is made of polycarbonate, and the second lens 20 is made of BK7 glass.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An lens system comprising a first lens and a second lens arranged in turn from an object side to an image side, whereby, the first lens includes a first surface facing toward the object side and a second surface facing toward the image side, the second lens includes a third surface facing toward the object side and a fourth surface facing toward the image side, the first, second, third and fourth surface are all aspherical, and the lens system satisfies the following conditions:

$0.08 \leq D2/D \leq 0.14$ $4 \leq h2/z2 \leq 12$ wherein,

D2 is the distance along an optical axis of the lens system from the second surface of the first lens to the third surface of the second lens, D is the distance along the optical axis of the lens system from the first surface of the first lens to the fourth surface of the second lens, h2 is the distance from the optical axis of the lens system to the outermost optically effective portion of the second lens surface of the first lens, and z2 is the distance along the optical axis of the lens system from the vertex of the second surface of the first lens to the point of the optical axis from where h2 is measured.

2. The lens system as claimed in claim 1, wherein the following condition is satisfied:

$0.9 \leq |f/R4| \leq 4$ wherein, f is the focal length of the entire lens system, and R4 is the radius of curvature of the fourth surface of the second lens.

3. The lens system as claimed in claim 1, wherein the following conditions are satisfied:

$|f2/f| \geq 1$ $1 \leq (f2)^2/|f1 \cdot f| \leq 35$ wherein, f is the focal length of the entire lens system, f2 is the focal length of the second lens, and f1 is the focal length of the first lens.

4. The lens system as claimed in claim 1, wherein the following condition is satisfied:

$$Vd1 \geq Vd2$$

wherein, Vd1 is the Abbe number at the d-line ($\lambda=587$ nm) of the lens material of the first lens, and Vd2 is the Abbe number at the d-line ($\lambda=587$ nm) of the lens material of the second lens.

5. The lens system as claimed in claim 1, wherein the first surface is a convex facing towards the object side, and the second surface is a concave facing towards the image side, the third surface is a concave facing towards the object side, and the fourth surface is a convex facing towards the image side.

6. The lens system as claimed in claim 5, wherein the following condition is satisfied:

$$0.9 \leq |f/R4| \leq 4$$

wherein, f is the focal length of the entire lens system, and R4 is the radius of curvature of the fourth surface of the second lens.

7. The lens system as claimed in claim 5, wherein the following conditions are satisfied:

$$|f2/f| \geq 1$$

$$1 \leq (f2)^2/|f1 \cdot f| \leq 35$$

wherein, f is the focal length of the entire lens system, f2 is the focal length of the second lens, and f1 is the focal length of the first lens.

8. The lens system as claimed in claim 5, wherein the following condition is satisfied:

$$Vd1 \geq Vd2$$

wherein, Vd1 is the Abbe number at the d-line ($\lambda=587$ nm) of the lens material of the first lens, and Vd2 is the Abbe number at the d-line ($\lambda=587$ nm) of the lens material of the second lens.

9. The lens system as claimed in claim 5, wherein the following conditions are satisfied:

$$0.9 \leq |f/R4| \leq 4$$

$$|f2/f| \geq 1$$

$$1 \leq (f2)^2/|f1 \cdot f| \leq 35$$

$$Vd1 \geq Vd2$$

wherein, f is the focal length of the entire lens system, and R4 is the radius of curvature of the fourth surface of the second lens, f2 is the focal length of the second lens, and f1 is the focal length of the first lens, Vd1 is the Abbe number at the d-line ($\lambda=587$ nm) of the lens material of the first lens, and Vd2 is the Abbe number at the d-line ($\lambda=587$ nm) of the lens material of the second lens.

10. The lens system as claimed in claim 1, wherein the type of the first, second, third and the fourth surface all meet the expression:

$$Z = \frac{ch^2}{1 + \sqrt{1-(k+1)c^2h^2}} + \sum A_i h^i$$

wherein, Z is the length of a line drawn from a point on the aspherical lens surface at a distance h from the optical axis to the tangential plane of the aspherical surface vertex, h is a height from the optical axis to the surface, c is a vertex curvature, k is a conic constant, and $A_i$ are i-th order correction coefficients of the aspherical surfaces.

11. The lens system as claimed in claim 1, wherein the first lens and the second lens are all aspherical plastic lenses.

12. The lens system as claimed in claim 11, wherein the following condition is satisfied:

$$0.9 \leq |f/R4| \leq 4$$

wherein, f is the focal length of the entire lens system, and R4 is the radius of curvature of the fourth surface of the second lens.

13. The lens system as claimed in claim 11, wherein the following conditions are satisfied:

$$|f2/f| \geq 1$$

$$1 \leq (f2)^2/|f1 \cdot f| \leq 35$$

wherein, f is the focal length of the entire lens system, f2 is the focal length of the second lens, and f1 is the focal length of the first lens.

14. The lens system as claimed in claim 11, wherein the following condition is satisfied:

$$Vd1 \geq Vd2$$

wherein, Vd1 is the Abbe number at the d-line ($\lambda=587$ nm) of the lens material of the first lens, and Vd2 is the Abbe number at the d-line ($\lambda=587$ nm) of the lens material of the second lens.

15. The lens system as claimed in claim 11, wherein the following conditions are satisfied:

$$0.9 \leq |f/R4| \leq 4$$

$$|f2/f| \geq 1$$

$$1 \leq (f2)^2/|f1 \cdot f| \leq 35$$

$$Vd1 \geq Vd2$$

wherein, f is the focal length of the entire lens system, and R4 is the radius of curvature of the fourth surface of the second lens, f2 is the focal length of the second lens, and f1 is the focal length of the first lens, Vd1 is the Abbe number at the d-line ($\lambda=587$ nm) of the lens material of the first lens, and Vd2 is the Abbe number at the d-line ($\lambda=587$ nm) of the lens material of the second lens.

16. The lens system as claimed in claim 1, wherein the following conditions are satisfied:

$$0.9 \leq |f/R4| \leq 4$$

$$Vd1 \geq Vd2$$

wherein, f is the focal length of the entire lens system, and R4 is the radius of curvature of the fourth surface of the second lens, Vd1 is the Abbe number at the d-line ($\lambda=587$ nm) of the lens material of the first lens, and Vd2 is the Abbe number at the d-line ($\lambda=587$ nm) of the lens material of the second lens.

17. The lens system as claimed in claim 1, wherein the following conditions are satisfied:

$$|f2/f| \geq 1$$

$$1 \leq (f2)^2/|f1 \cdot f| \leq 35$$

$$Vd1 \geq Vd2$$

wherein, f is the focal length of the entire lens system, f2 is the focal length of the second lens, and f1 is the focal length of the first lens, Vd1 is the Abbe number at the d-line (λ=587 nm) of the lens material of the first lens, and Vd2 is the Abbe number at the d-line (λ=587 nm) of the lens material of the second lens.

18. The lens system as claimed in claim 1, wherein the following conditions are satisfied:

$$0.9 \leq |f/R4| \leq 4$$

$$|f2/f| \geq 1$$

$$1 \leq (f2)^2/|f1 \cdot f| \leq 35$$

$$Vd1 \geq Vd2$$

wherein, f is the focal length of the entire lens system, and R4 is the radius of curvature of the fourth surface of the second lens, f2 is the focal length of the second lens, and f1 is the focal length of the first lens, Vd1 is the Abbe number at the d-line (λ=587 nm) of the lens material of the first lens, and Vd2 is the Abbe number at the d-line (λ=587 nm) of the lens material of the second lens.

* * * * *